April 2, 1963   A. NANSON   3,083,584
CONTACT OR SIMILAR WHEELS FOR ABRASIVE BELTS OR THE LIKE
Filed June 28, 1961
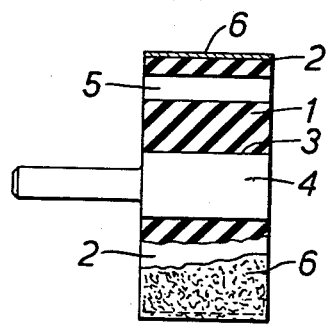
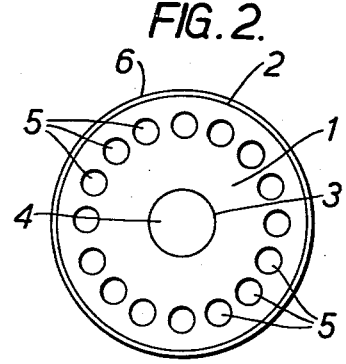
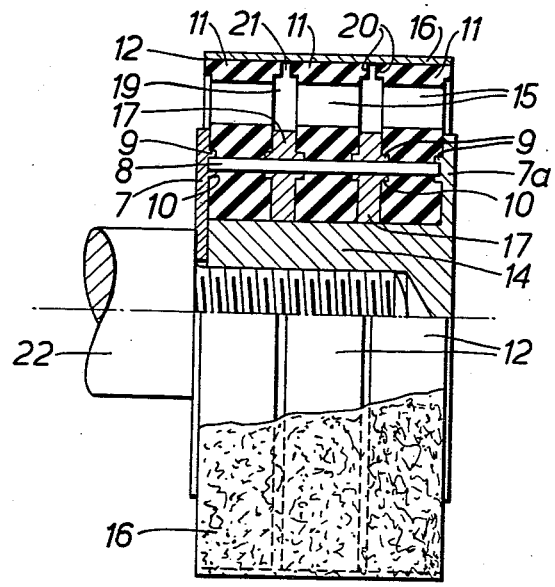
Inventor:-
Arthur Nanson
Watson, Cole, Grindle & Watson
Attorneys 3,083,584
CONTACT OR SIMILAR WHEELS FOR ABRASIVE
BELTS OR THE LIKE
Arthur Nanson, 53 Halford Lane, Keresley,
Coventry, England
Filed June 28, 1961, Ser. No. 120,396
Claims priority, application Great Britain July 9, 1960
2 Claims. (Cl. 74—230.7)

This invention has reference to contact or similar wheels for abrasive belts or the like either where an endless belt or band passes round the contact or like wheel and also another wheel or wheels in use, or where the belt in the form of a sleeve fits about the periphery of the wheel and the invention is more particularly concerned with the latter.

The invention relates to that kind of contact or similar wheel having a peripheral portion or portions of resilient or yieldable material such as rubber or the like which is capable of centrifugal expansion when rotated at speed in order to frictionally engage an abrasive or like belt about the wheel.

The object of the invention is to provide an improved form or construction of contact or similar wheel of the above mentioned kind.

In the accompanying drawings:

FIGURES 1 and 2 are side end views respectively of a contact wheel according to this invention shown fitted with an abrasive band or sleeve.

FIGURE 3 is a view similar to FIGURE 2 showing a developed construction of the wheel.

In practice the wheel or a peripheral portion or portions thereof is or are of a resilient or yieldable material such as rubber or other material having similar properties such as a suitable synthetic plastic material. Rubber or similar material of suitable resilient properties may be selected according to the nature of the work for which the wheel is intended.

In a simple embodiment of the invention shown in FIGURES 1 and 2 the wheel may be of one piece construction such as in the form of a rubber moulding 1 so as to provide a preferably flat and smooth periphery 2 whilst the centre of the wheel may be provided with a hole 3 for receiving a hub or spindle 4 to which it may be bonded.

In accordance with this invention the wheel is provided with a series of holes or openings 5 (e.g. of round form as shown) near to the peripheral surface 2 but not breaking into the latter so that said surface 2 remains uninterrupted. The holes 5 preferably extend through the wheel from one side face to the other and preferably have their axes parallel with the wheel axis whilst also as shown the holes 5 are preferably equally spaced around the wheel.

The provision of the holes 5 is such that the wheel has a greater tendency towards radial expansion of the periphery 2 due to centrifugal force when rotated at speed with the result that a belt or band 6 passing or fitted round the wheel is frictionally and firmly engaged by the wheel periphery 2 so as to be driven in a positive manner.

In the case of a belt or band 6 of sleeve-like form shown, the band 6 may be a comparatively loose fit about the wheel when stationary or running slowly but is firmly gripped thereby on rotation at high speed. Thus, a worn band 6 may be readily discarded and quickly replaced by a fresh one by simply briefly stopping the rotation of the wheel or slowing it down sufficiently for the purpose. The facility and time saving manner in which the bands 5 can be slipped on and off the wheel is particularly suited for mass production purposes.

In addition to the desired properties of peripheral or radial expansion the provision of the holes or openings 5 also provides a flexing or cushioning effect of the wheel periphery 2 during abrading or sanding whereby the action of the latter is improved due to the peripheral "flat" maintained against the work. Furthermore, the holes 5 promote heat dissipation and thus have a cooling effect whilst in the event of breakage of a band 6 or the wheel being inadvertently driven at speed without a band 6 the likelihood of the wheel periphery 3 disintegrating is avoided or very largely minimised owing to the fact that the wheel is bounded by the continuous or uninterrupted form of the periphery 2.

Where, as is usual, a high speed of rotation of the contact wheel is required, e.g. of the order of 6,000 r.p.m. in the case of a four inch diameter wheel (for providing an abrasive belt speed of around 6,000 feet per minute), restriction on the expansive tendency of the body of rubber or like material of the wheel may be necessary.

For this purpose side discs 7, 7a (FIGURE 3) or the like of metal or of other suitable rigid material and of a smaller diameter than the wheel may be provided having ribs or like projections 9 on their faces for engaging corresponding recesses or grooves 10 in the side faces of the rubber wheel 11. The ribs 9 and grooves 10 may be of any suitable cross section and may be of annular form, whilst if desired the discs 7, 7a may carry pins such as that shown at 8 which enter corresponding holes in the rubber wheel preferably in an axially parallel manner. Such rib and groove engagement 9, 10 or pinning or keying 8 should not interfere with the expansive action of the peripheral portion 12 of the wheel that is provided with the holes or openings 15 but restrains the inner part of the wheel against undue bodily expansion at high speeds of rotation.

Wheels according to the foregoing may be produced in suitable diameters and peripheral widths e.g. as a range of standard sizes. However if desired and also as shown in FIGURE 3 provision may be made for a built up construction for obtaining various peripheral widths in which case wheels or wheel sections 11 may be mountable on a common hub or spindle 14, each wheel or section 11 having holes or openings 15 near the periphery 12 in accordance with this invention.

The wheels or sections 11 may have washers or discs 17 disposed between them which as shown may have a keying or pinning engagement with the wheels or sections 11 in the manner already described.

Thus each pin 8 may pass through the discs or washers 17, i.e. at the ribs 9 of the latter which engage grooves 10 in the wheel sections 11. Alternatively or additionally ribs on the wheel or wheel sections may engage grooves in the washers 17 and also in the discs 7, 7a.

In order to accommodate any such washers or discs 17 the side faces of the wheels or sections 11 may be recessed at 19 so that any gap between the peripheries 12 of the wheels or sections 11 is substantially closed (e.g. by side flanges 20) and a more or less continuous peripheral surface maintained across the complete wheel. However in some cases a peripheral gap 21 between the wheels or sections 11 is desirable so that the built up wheel with a band 16 thereabout is capable of accommodating edges or like formations of work to be sanded.

The hub 14 is shown screwed on a driving shaft or shank 22 and in addition to a friction drive between the hub 14 and wheel sections 11, the disc 7a is shown as being integral with the hub 14 whilst the disc 7 is clamped between the shaft 22 and hub 14. Together with the pin engagement 8 a positive drive is imparted to the wheel sections 11.

Whilst particularly suited for the purpose of driving or receiving abrasive belts or bands, wheels according to this invention may be also used in conjunction with transmission belts for obtaining an effective drive between the wheel and the latter.

I claim:

1. A contact wheel of the character described comprising a hub; a wheel of resilient rubber-like material about said hub and rotatable therewith, said wheel having a smooth uninterrupted periphery and having a series of open holes arranged around the wheel a distance from the hub so as to be substantially closer to said periphery but without breaking into the latter, said holes extending from one side face to the other of the wheel and having their axes parallel with the axis of the wheel whereby radial expansion of the wheel periphery takes place at a working speed of rotation.

2. A contact wheel comprising a hub; a plurality of wheel sections of resilient rubber-like material arranged side by side about said hub and rotatable therewith, each said wheel section having a smooth uninterrupted periphery and having holes near to said periphery extending through the section from one side face to the other, said holes being equi-spaced and having their axes parallel with the axis of the wheel whereby radial expansion of each said wheel section takes place at a working speed of rotation of the wheel; and discs of rigid material and of smaller diameter than said wheel sections, said discs being co-axial with said sections and having a positive inter engagement therewith in order to restrict undue expansion of said sections at a high speed of rotation thereof.

References Cited in the file of this patent

UNITED STATES PATENTS

| | | |
|---|---|---|
| 2,444,088 | Becker | June 29, 1948 |
| 2,572,276 | Moe | Oct. 23, 1951 |

FOREIGN PATENTS

| | | |
|---|---|---|
| 958,972 | Germany | Feb. 28, 1957 |